United States Patent
Yamada

(10) Patent No.: US 11,128,461 B2
(45) Date of Patent: Sep. 21, 2021

(54) ENCRYPTION PROCESSING APPARATUS AND ENCRYPTION PROCESSING METHOD

(71) Applicant: CANON KABUSHIKI KAISHA, Tokyo (JP)

(72) Inventor: Shinya Yamada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 306 days.

(21) Appl. No.: 15/904,042

(22) Filed: Feb. 23, 2018

(65) Prior Publication Data

US 2018/0254902 A1    Sep. 6, 2018

(30) Foreign Application Priority Data

Mar. 6, 2017    (JP) .............................. JP2017-041451

(51) Int. Cl.
*H04L 29/06* (2006.01)
*G06F 21/00* (2013.01)
*H04L 9/30* (2006.01)
*G06F 7/72* (2006.01)

(52) U.S. Cl.
CPC ............ *H04L 9/3066* (2013.01); *G06F 7/725* (2013.01)

(58) Field of Classification Search
CPC ..... H04L 9/3066; G06F 7/725; G06F 11/2046
See application file for complete search history.

(56) References Cited

U.S. PATENT DOCUMENTS

| | | | | |
|---|---|---|---|---|
| 7,461,775 | B2 * | 12/2008 | Swift | G06Q 20/042 235/375 |
| 8,199,910 | B2 * | 6/2012 | Morioka | H04L 9/3066 380/28 |
| 8,458,479 | B2 * | 6/2013 | Takashima | H04L 9/3252 713/176 |
| 9,553,723 | B2 * | 1/2017 | Nguyen | H04L 9/0861 |

(Continued)

FOREIGN PATENT DOCUMENTS

| | | |
|---|---|---|
| JP | 2005-316038 A | 11/2005 |
| JP | 3797808 B2 * | 7/2006 |

(Continued)

OTHER PUBLICATIONS (R Schroeppel, et al., Lecture Notes in Computer Science, 15 th Annual International Cryptology Conference Santa Barbara, California, USA, Aug. 27-31, 1995 Proceedings—Springer, pp. 1-478, hereinafter Schroeppel).*

(Continued)

*Primary Examiner* — Lisa C Lewis
(74) *Attorney, Agent, or Firm* — Canon U.S.A., Inc. IP Division

(57) ABSTRACT

An apparatus computing scalar multiplication of a point on an elliptic curve by a scalar value includes an estimation unit configured to estimate a pre-computation amount based on the scalar value, a pre-computation unit configured to perform pre-computation based on the point on the elliptic curve by using the estimated pre-computation amount, a generating unit configured to generate an internal representation of the scalar value by using the estimated pre-computation amount, and a computation unit configured to output a result of the scalar multiplication of the point based on the result of the pre-computation and the internal representation.

16 Claims, 8 Drawing Sheets

(56) References Cited

U.S. PATENT DOCUMENTS

| | | | | |
|---|---|---|---|---|
| 2003/0059042 | A1* | 3/2003 | Okeya | G06F 7/725 380/30 |
| 2003/0059043 | A1* | 3/2003 | Okeya | G06F 7/725 380/30 |
| 2003/0142820 | A1* | 7/2003 | Futa | G06F 7/725 380/30 |
| 2008/0063189 | A1* | 3/2008 | Katti | G06F 7/5332 380/30 |
| 2010/0040225 | A1* | 2/2010 | Venelli | H04L 9/004 380/28 |
| 2011/0194694 | A1* | 8/2011 | Struik | H04L 9/3252 380/255 |
| 2014/0105381 | A1* | 4/2014 | Al-Somani | G06F 7/725 380/28 |
| 2015/0358162 | A1* | 12/2015 | Kobayashi | H04L 9/3013 713/189 |
| 2016/0149703 | A1* | 5/2016 | Al-Somani | H04L 9/3066 380/28 |
| 2017/0180114 | A1* | 6/2017 | Murdica | H04L 9/003 |
| 2017/0346633 | A1* | 11/2017 | Bos | H04L 9/002 |

FOREIGN PATENT DOCUMENTS

| | | | |
|---|---|---|---|
| JP | 2013-77313 A | | 4/2013 |
| JP | 2013-186204 A | | 9/2013 |
| JP | 2013186204 A | * | 9/2013 |
| WO | WO 2015/121324 | * | 8/2015 |

OTHER PUBLICATIONS

Erik Woodward Knudsen, Elliptic Scalar Multiplication Using Point Halving, International Conference on the Theory and Application of Cryptology and Information Security, Singapore, Nov. 14-18, 1999 Proceedings, pp. 1-426.*

G. N. Purohit, et al., (Fast Scalar Multiplication in ECC Using The Multi Base Number System, IJCSI International Journal of Computer Science Issues, vol. 8, Issue 1, Jan. 2011, hereinafter Purohit).*

* cited by examiner

FIG. 2

| BINARY REPRESENTATION | 1 | 0 | 1 | 0 | 0 | 1 | 1 | 0 | 1 | 1 | 1 | 0 | 1 | 1 | 1 | 1 | 0 | 1 | 0 | 1 |
|---|---|---|---|---|---|---|---|---|---|---|---|---|---|---|---|---|---|---|---|---|
| MOF REPRESENTATION | 0 | 0 | 5 | 0 | 0 | 0 | 7 | 0 | 0 | 0 | 0 | −5 | 0 | 0 | 0 | 0 | 0 | −3 | 0 | 1 |

ENCRYPTION PROCESSING APPARATUS AND ENCRYPTION PROCESSING METHOD

BACKGROUND OF THE INVENTION

Field of the Invention

The aspect of the embodiments relates to an encryption processing apparatus and an encryption processing method for performing scalar multiplication.

Description of the Related Art

Elliptic curve cryptography has been widely spread as a public key encryption scheme. Standards for Efficient Cryptography Group (SECG) provide recommended elliptic curve parameters in SEC 2 for increased commercial usage of elliptic curve cryptography. National Institute of Standards and Technology (NIST) standardizes ECDSA, which is DSA applying elliptic curve cryptography, in fips 186-3.

Elliptic curve cryptographic processing may need to perform a computation called scalar multiplication. A scalar multiplication is a computation for obtaining kP where k is an integer value and P is a point on an elliptic curve. A scalar multiplication on an elliptic curve using an element assembly generally applies a Non-Adjacent Form (NAF) representation. Japanese Patent Laid-Open No. 2013-186204 discloses use of such a NAF representation. By performing a scalar multiplication using such a representation, kP can be obtained through a lower number of additions than that of a scalar multiplication using a binary representation.

A NAF representation is generated which has digits each having one of values 0, 1, and −1 in a 2-bit window width. Japanese Patent Laid-Open No. 2013-77313 discloses that each of the digits has a higher absolute value in a larger window width.

Alternatively, a MOF representation similar to a NAF representation may be used instead. A MOF representation is a representation which can be generated from left to right or sequentially from the most significant bit. While a window-NAF algorithm applied as a scalar multiplication algorithm performs a computation by using a NAF representation, Japanese Patent Laid-Open No. 2005-316038 discloses that the computation can be performed in combination with a MOF representation.

The window-NAF algorithm may need pre-computation. A required pre-computation amount depends on the window width of a NAF representation or a MOF representation that is an internal representation to be used in an algorithm. However, the window width may be required to be determined before the computation, and, therefore, the optimum size of the window width is not known. The required pre-computation amount exponentially increases every time the window width is increased by 1 bit. Therefore, adjustment of the window width may be difficult.

SUMMARY OF THE INVENTION

An apparatus computing scalar multiplication of a point on an elliptic curve by a scalar value according to an aspect of the present disclosure includes an estimation unit configured to estimate a pre-computation amount based on the scalar value, a pre-computation unit configured to perform pre-computation based on the point on the elliptic curve by using the estimated pre-computation amount, a generating unit configured to generate an internal representation of the scalar value by using the estimated pre-computation amount, and a computation unit configured to output a result of the scalar multiplication of the point on the elliptic curve based on the result of the pre-computation and the internal representation.

Further features of the disclosure will become apparent from the following description of exemplary embodiments with reference to the attached drawings.

BRIEF DESCRIPTION OF THE DRAWINGS

FIG. 2 illustrates a MOF representation example.

DESCRIPTION OF THE EMBODIMENTS

Figure 1:
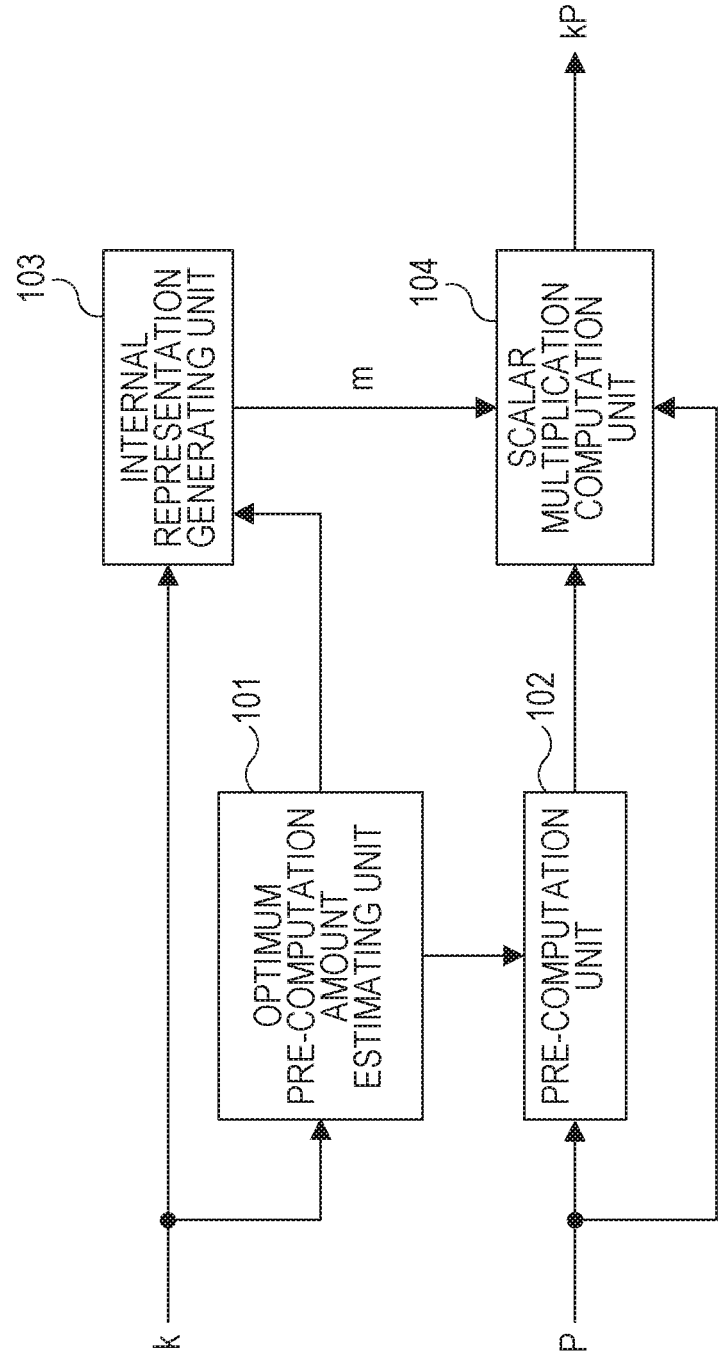
FIG. 1 illustrates a configuration example of a scalar multiplication computing apparatus.

FIG. 1 illustrates a configuration example of a scalar multiplication computing apparatus according to an embodiment of the present disclosure. The scalar multiplication computing apparatus functions as an encryption processing apparatus and performs scalar multiplication computation for processing based on elliptic curve cryptography that is one of public key encryption schemes relating to a security technology. A scalar multiplication is an operation for calculating kP where k is a scalar value (integer value) and P is a point on an elliptic curve. The scalar multiplication computing apparatus has an optimum pre-computation amount estimating unit 101, a pre-computation unit 102, and an internal representation generating unit 103 and is configured to compute a scalar multiplication of a point P on an elliptic curve by a scalar value k. The scalar multiplication computing apparatus receives a scalar value k and a point P on an elliptic curve and outputs a result kP of a scalar multiplication of the point P on the elliptic curve by the scalar value k. A scalar multiplication computing method for a scalar multiplication computing apparatus will be described below.

The optimum pre-computation amount estimating unit 101 is configured to estimate an optimum pre-computation amount based on the scalar value k. An algorithm to be used in the optimum pre-computation amount estimating unit 101 will be described in detail below. The pre-computation unit 102 is configured to perform pre-computation based on the point P on the elliptic curve by the optimum pre-computation amount obtained by the optimum pre-computation amount estimating unit 101 and outputs a pre-computation result. The internal representation generating unit 103 is configured to generate and output a MOF representation (internal representation) m of the scalar value k by using the optimum pre-computation amount obtained by the optimum pre-computation amount estimating unit 101. A method for generating a MOF representation will be described in detail below. The scalar multiplication computation unit 104 is configured to output a result kP obtained by performing scalar multiplication on the point P on the elliptic curve by the scalar value k based on the pre-computation result by the pre-computation unit 102, the MOF representation m, and the point P.

FIG. 2 illustrates an example of the MOF representation m generated by the internal representation generating unit 103. FIG. 2 illustrates numbers of identical values represented in a binary representation and a MOF representation. A binary representation can represent a value of each digit by 0 or 1 while a MOF representation can represent a value of each digit by 0, a negative number, or a positive number.

Figure 3:
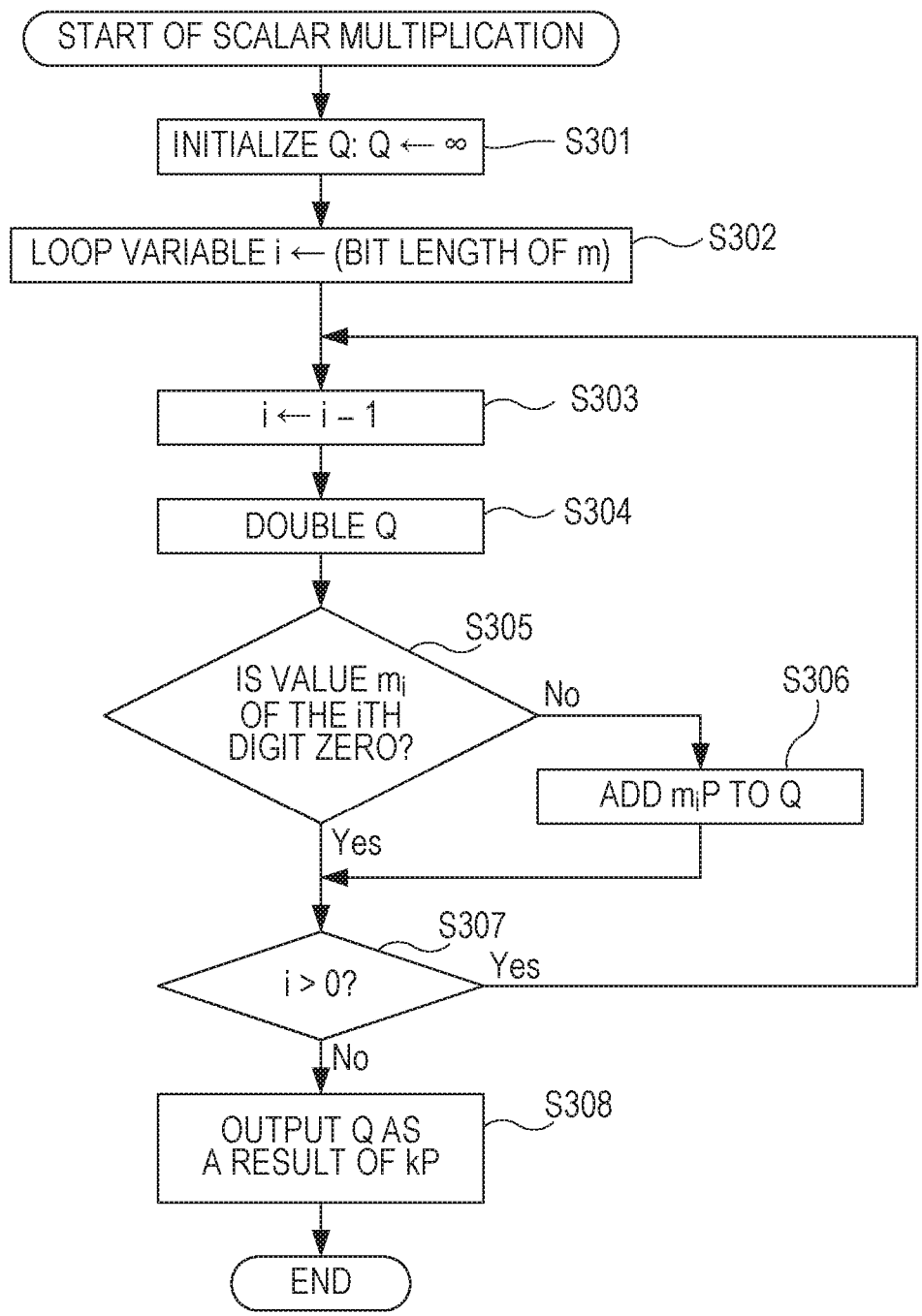
FIG. 3 is a flowchart illustrating processing to be performed by a scalar multiplication computation unit.

FIG. 3 is a flowchart representing an algorithm to be implemented in the scalar multiplication computation unit 104. The scalar multiplication computation unit 104 is a computation unit configured to compute kP by using a window-NAF algorithm. More specifically, the scalar multiplication computation unit 104 obtains kP by performing addition and doubling of a point on an elliptic curve based on values of bits of a MOF representation m of the scalar value k. In step S301, the scalar multiplication computation unit 104 substitutes ∞ for a variable Q representing an intermediate result of the computation for initialization of the variable Q. Here, ∞ is a point representing 0 in an addition process on an elliptic curve. In other words, a relationship P+∞=P holds. Next, in step S302, the scalar multiplication computation unit 104 substitutes a value (of a bit length of the MOF representation m of the scalar value k) being an initial value for i being a loop variable. Next, in step S303, the scalar multiplication computation unit 104 substitutes i−1 for the loop variable i to update the loop variable i. Next, in step S304, the scalar multiplication computation unit 104 doubles the value of the variable Q. In other words, the scalar multiplication computation unit 104 performs doubling of the point on the elliptic curve every one loop for the variable Q. Next, in step S305, the scalar multiplication computation unit 104 determines whether the value mi of the ith bit of the MOF representation m is 0 or not. If the scalar multiplication computation unit 104 determines it is 0, the processing moves to step S307. If not, the processing moves to step S306. In step S306, the scalar multiplication computation unit 104 adds $m_i$P to the intermediate result Q for addition of a point on the elliptic curve. Then processing then moves to step S307. More specifically, because the point corresponding to $m_i$P is obtained in advance by the pre-computation unit 102, the scalar multiplication computation unit 104 adds the preliminary result $m_i$P thereof to Q. In step S307, the scalar multiplication computation unit 104 determines whether the loop variable i is higher than 0 or not. If the scalar multiplication computation unit 104 determines that it is higher than 0, the processing returns to step S303. If the scalar multiplication computation unit 104 determines that it is not higher than 0, the processing moves to step S308. In step S308, the scalar multiplication computation unit 104 outputs the value of the variable Q as a computation result of kP. Then, the processing ends.

Referring to FIG. 3, the doubling in step S304 and the addition in step S306 are heavy processes. Between them, the process in step S306 is skipped if the value $m_i$ is equal to 0. The scalar multiplication computation unit 104 performs the addition in step S306 for the number of non-zero digits of the MOF representation m. In other words, the scalar multiplication computation unit 104 adds the value $m_i$P obtained by computing value multiplication of each digit $m_i$ at the point P on the elliptic curve if the digits $m_i$ of the MOF representation m are not 0. Therefore, the computation cost on the scalar multiplication 104 increases as the number of executions of step S306 increases.

Figure 4:
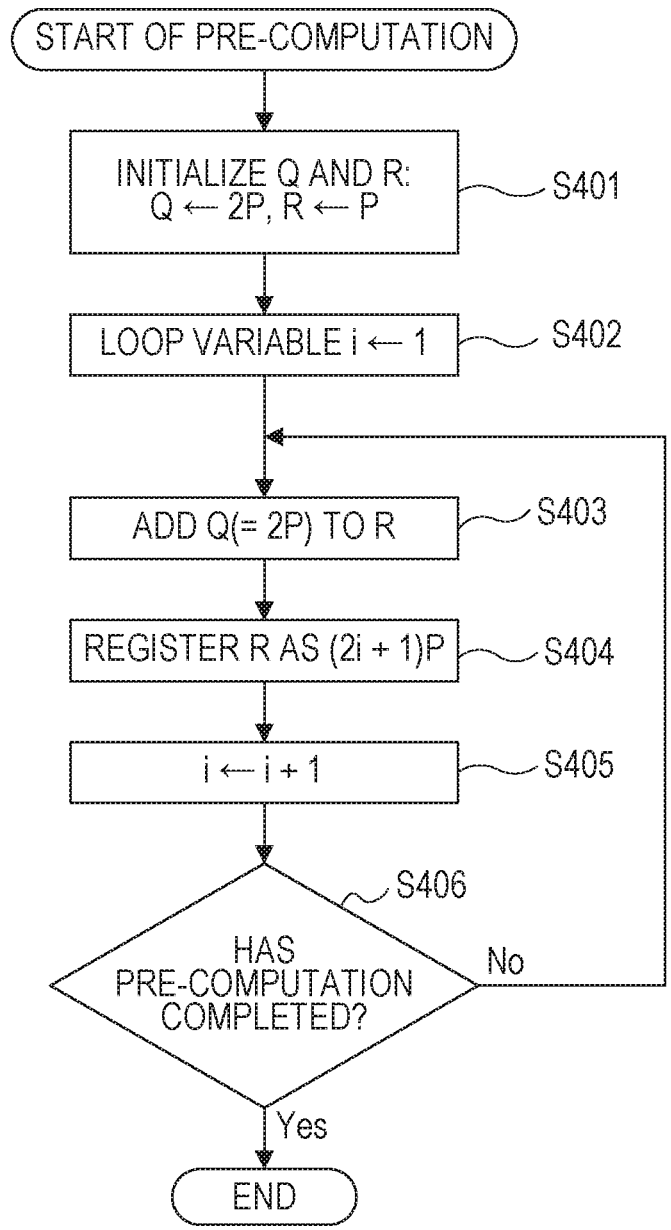
FIG. 4 is a flowchart illustrating processing to be performed by a pre-computation unit.

FIG. 4 is a flowchart illustrating an algorithm to be implemented in the pre-computation unit 102. The pre-computation unit 102 performs processing for pre-computing three or more points 3P, 5P, 7P, . . . of odd multiples of the point P on the elliptic curve. In step S401, the pre-computation unit 102 substitutes the point 2P for the variable Q and substitutes the point P for the variable R to initialize the variables Q and R. Next, in step S402, the pre-computation unit 102 substitutes an initial value of 1 for the loop variable i. Next, in step S403, the pre-computation unit 102 adds the variable Q (=2P) to the point of the pre-computation result R of the last loop to perform processing for one pre-computation. The variable Q corresponds to a double value 2P with respect to the point P on the elliptic curve. Next, in step S404, the pre-computation unit 102 registers the computation result R obtained in step S403 as a pre-computation result of (2i+1)P. Next, in step S405, the pre-computation unit 102 substitutes i+1 for the loop variable i. Next, in step S406, the pre-computation unit 102 determines whether the pre-computation has completed by processing an upper limit number of points that can be pre-computed or not with reference to the loop variable i. If not, the processing returns to step S403. If so, the processing ends. Thus, the pre-computation unit 102 can compute the three or more points 3P, 5P, 7P, . . . of odd multiples of the point P on the elliptic curve.

Referring to FIG. 4, the doubling in step S401 and the addition in step S403 are heavy processes. Between them, the addition in step S403 is repeatedly executed the number of times corresponding to the pre-computation amount. Therefore, the computation cost on the pre-computation unit 102 increases as the number of executions of the process in step S403 increases.

The computation cost on the pre-computation unit 102 and the computation cost on the scalar multiplication 104 constitute the entire processing cost. Referring to FIGS. 3 and 4, these computation costs depend on the numbers of times of execute of the processes in step S306 and S403. Here, because the addition processes are performed both in steps S306 and S403, the computation costs are equal in steps S306 and step S403. Therefore, in order to estimate a pre-computation amount which produces a minimum entire computation cost, a pre-computation amount for a minimum sum of the number of executions of the process in step S306 and the number of execution of the process in step S403 is obtained by the optimum pre-computation amount estimating unit 101.

Figure 5:
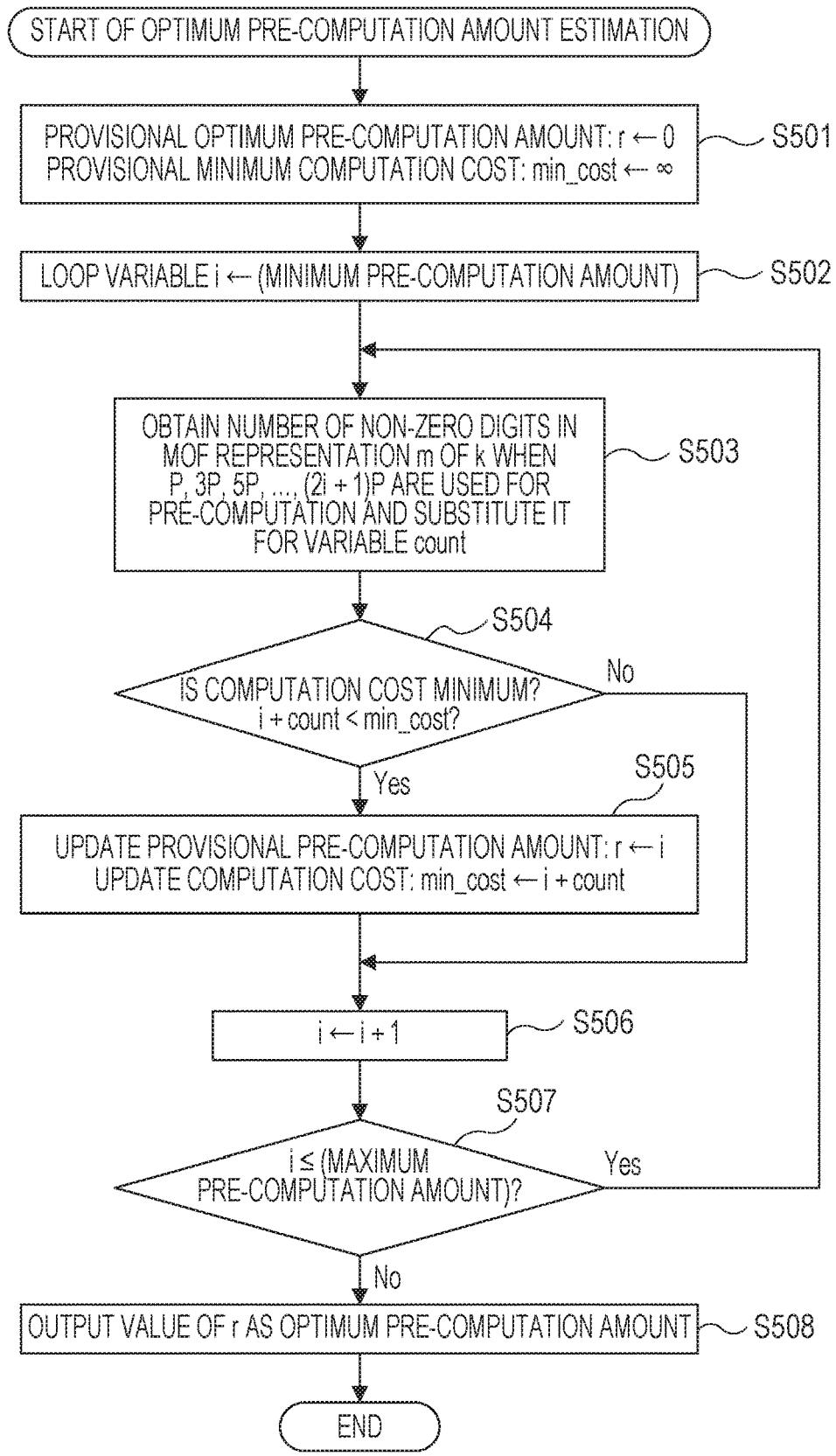
FIG. 5 is a flowchart illustrating processing to be performed by an optimum pre-computation amount estimating unit.

FIG. 5 is a flowchart illustrating an algorithm to be implemented in the optimum pre-computation amount estimating unit 101. In step S501, in order to initialize a variable r for holding a provisional optimum pre-computation amount and a variable min_cost for holding the cost then, the optimum pre-computation amount estimating unit 101 substitutes 0 for the variable r and substitutes ∞ for the variable min_cost. Next, in step S502, in order to initialize the loop variable i, the optimum pre-computation amount estimating unit 101 substitutes a minimum value of the pre-computation amount for the loop variable i. Next, in step S503, the optimum pre-computation amount estimating unit 101 substitutes the number of non-zero digits of the MOF representation m of k for a variable "count" where pre-computations about P, 3P, 5P, . . . , (2i+1)P are executed with the pre-computation amount is equal to i. In this case, the variable i represents the number of executions of the process in step S306, and the variable "count" represents the number of executions of the process in step S403. The value to be substituted for the variable "count" will be described below. Next, in step S504, in order to determine whether the computation cost is minimum, the optimum pre-computation amount estimating unit 101 determines whether the sum of the variable i representing the number of executions of the process in step S306 and the variable "count" representing the number of executions of the process in step S403 is lower than the variable min_cost or not. If the optimum pre-computation amount estimating unit 101 determines that the sum is lower than the variable min_cost, the processing moves to step S505. If not, the processing moves to step S506. In step S505, the optimum pre-computation amount estimating unit 101 substitutes the pre-computation amount i that is a provisional optimum pre-computation amount for the variable r and substitutes the sum of the variable i and the variable "count" for the variable min_cost. Next, in step S506, the optimum pre-computation amount estimating unit 101 substitutes i+1 for the loop variable i. Next, in step S507, the optimum pre-computation amount estimating unit 101 determines whether the loop variable i is equal to or lower than a maximum value of the pre-computation amount or not. If the optimum pre-computation amount estimating unit 101 determines that the loop variable i is equal to or lower than the maximum value, the processing moves to step S503. If not, the processing moves to step S508. In step S508, the optimum pre-computation amount estimating unit 101 outputs the value of the variable r as an optimum pre-computation amount. The processing then ends. The pre-computation unit 102 in step S406 compares the optimum pre-computation amount r and the loop variable i to determine a pre-computation amount. The pre-computation unit 102 performs the addition in step S403 the number of times corresponding to the optimum pre-computation amount r estimated by the optimum pre-computation amount estimating unit 101.

The optimum pre-computation amount estimating unit 101 estimates, as an optimum pre-computation amount r, the pre-computation amount for a minimum sum of the number "count" of non-zero digits of the MOF representation m for each different pre-computation amount obtained by the pre-computation 102 and the pre-computation amount i obtained by the pre-computation unit 102, as described above.

Figure 6:
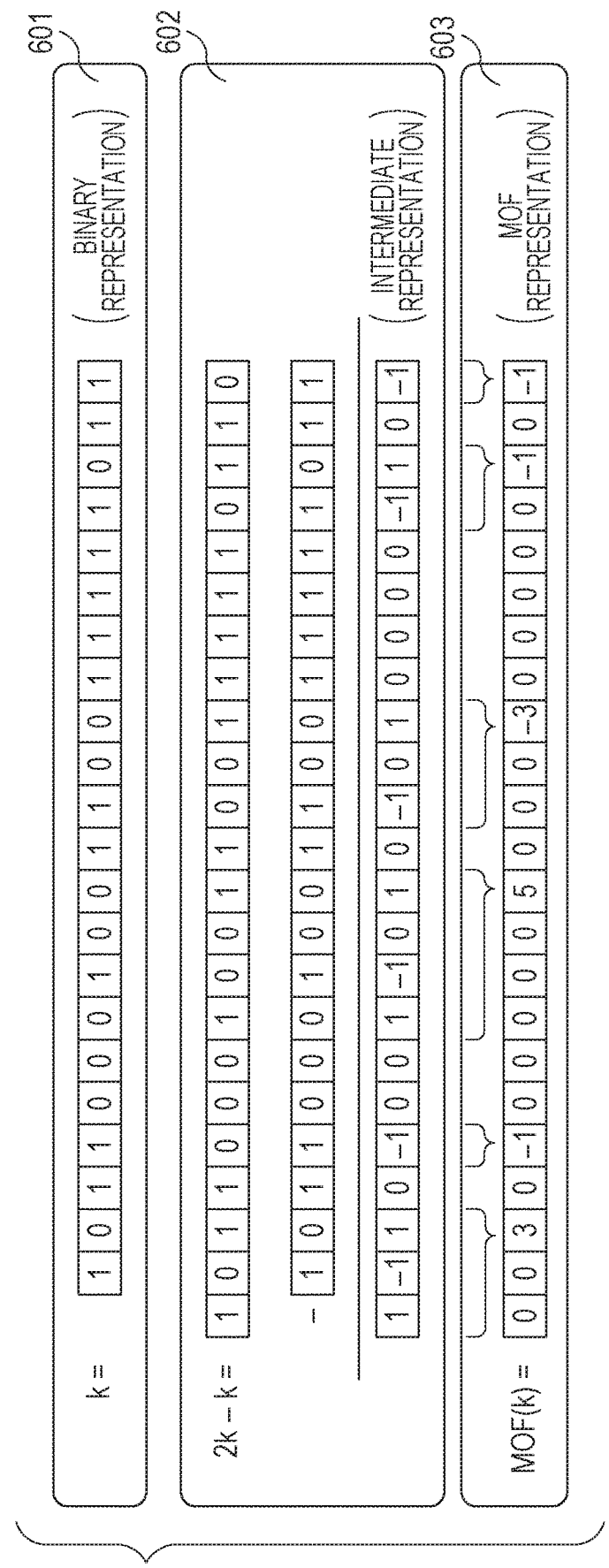
FIG. 6 illustrates a method for generating a MOF representation.

FIG. 6 is a schematic explanatory diagram illustrating a MOF generation algorithm to be implemented in step S503 and in the internal representation generating unit 103. A binary representation 601 represents a scalar value k in a binary number. An intermediate representation 602 represents a value of 2k−k. Because 2k−k and k have an identical value, the binary representation 601 and the intermediate representation 602 represent an identical value. However, the intermediate representation 602 computes 2k−k without borrowing across digits. It means that, when one digit has a value "0" in 2k and value "1" in k, the digit has a value "−1" in the intermediate representation 602. The MOF representation 603 represents one digit collectively representing values of a plurality of digits in the intermediate representation 602. Through this procedure, the internal representation generating unit 103 converts the binary representation 601 to the MOF representation 603 with respect to the scalar value k.

Figure 7:
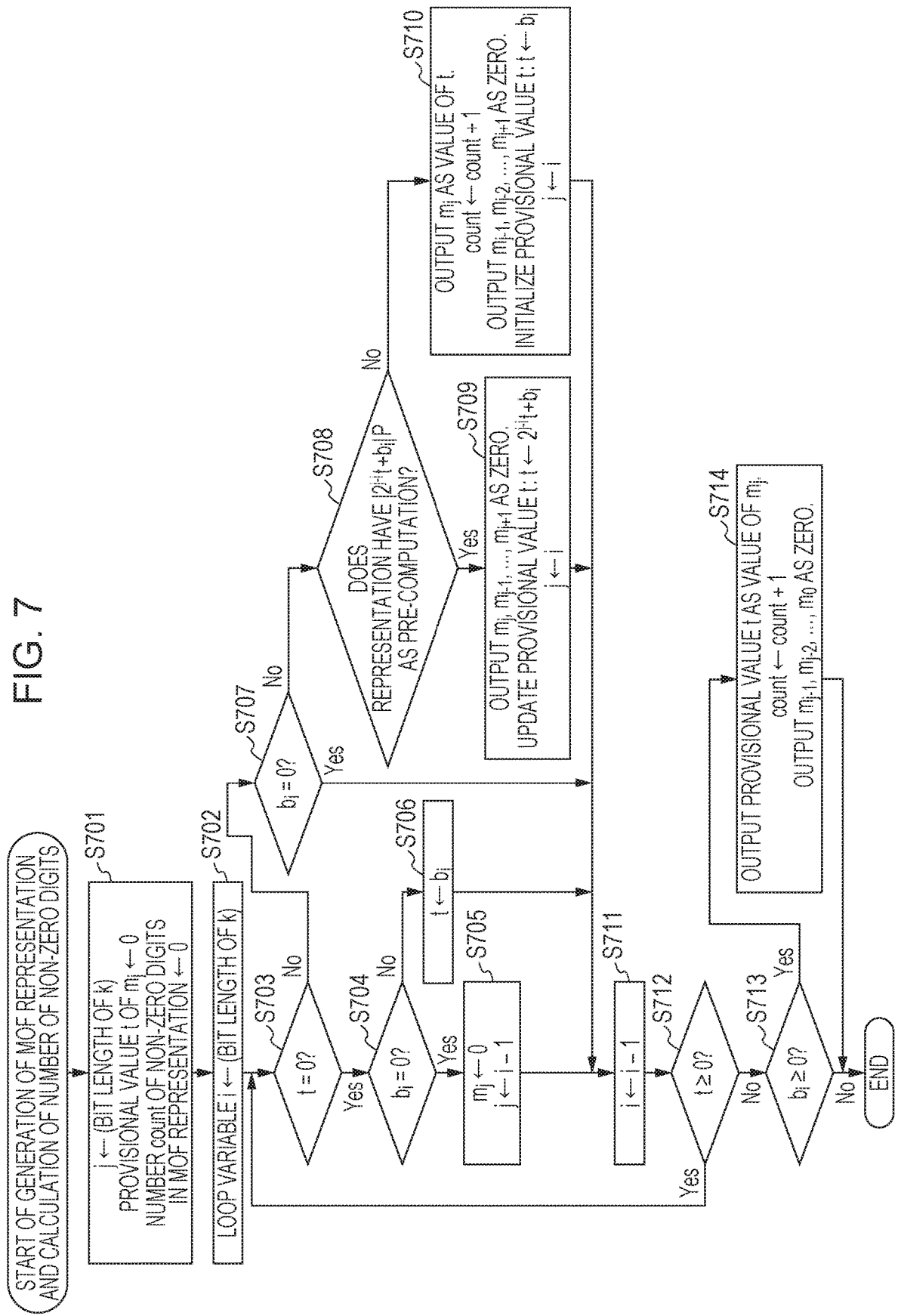
FIG. 7 is a flowchart illustrating an algorithm for generating a MOF representation.

FIG. 7 is a flowchart illustrating a MOF generation algorithm to be implemented in step S503 and in the internal representation generating unit 103. The scalar value k has bits having values $b_u$, $b_{u−1}$, $b_1$, $b_0$ represented in the intermediate representation 602 where the bit length of the scalar value k is equal to u. A MOF representation m to be generated by the algorithm has bits having $m_u$, $m_{u−1}$, ..., $m_1$, $m_0$. In step S701, the internal representation generating unit 103 substitutes the value of the bit length of k for a variable j, substitutes 0 for a variable t holding a provisional value of $m_j$, and substitutes 0 for the variable "count" representing the number of non-zero digits of the MOF representation. The variable j is a variable representing the digit to be output next. The variable "count" has a value to be used in step S503. Next, in step S702, the internal representation generating unit 103 substitutes the bit length of k for the loop variable i. Next, in step S703, the internal representation generating unit 103 determines whether the provisional value t of $m_j$ is equal to 0 or not. If so, the processing moves to step S704. If not, the processing moves to step S707. In step S704, the internal representation generating unit 103 determines whether a digit $b_i$ of the ith bit of the intermediate representation has 0 or not. If so, the processing moves to step S705. If not, the processing moves to step S706. In step S705, because both of the provisional value t and the intermediate representation $b_i$ have 0, the internal representation generating unit 103 substitutes 0 for m and substitutes j−1 for the variable j. The processing moves to step S711. In step S706, because the intermediate representation $b_i$ does not have 0, the internal representation generating unit 103 substitutes $b_i$ for the provisional value t. The processing moves to step S711. In step S707, the internal representation generating unit 103 determines whether the digit $b_i$ of the ith bit of the intermediate representation has 0 or not. If so, the processing moves to step S711. If not, the processing moves to step S708. In step S708, because the provisional value t is not 0 and the intermediate representation $b_i$ is not 0, the internal representation generating unit 103 determines whether the provisional value t is to be updated or whether provisional value t is to be output as $m_j$. More specifically, a value $(2^{j−1}t+b_i)$ is obtained if the provisional value t is updated, but the provisional value t can be updated if the point at $|2^{j−i}t+b_i|P$ is already given as a pre-computation result. Accordingly, the internal representation generating unit 103 determines whether the point at $|2^{j−i}t+b_i|P$ is already given as a pre-computation result or not based on the optimum pre-computation amount r output from the optimum pre-computation amount estimating unit 101. If the internal representation generating unit 103 determines so, the processing moves to step S709. If not, the processing moves to step S710. In step S709, the internal representation generating unit 103 outputs 0 as $m_j$, $m_{j−1}$, ..., $m_{i+1}$, substitutes $(2^{j−i}t+b_i)$ for the provisional value t, and substitutes i for the variable j. The processing then moves to step S711. In S710, the internal representation generating unit 103 outputs the provisional value t as a value of $m_j$, substitutes "count+1" for the variable "count", outputs $m_{j−i}$, $m_{j−2}$, ..., $m_{j+1}$ as 0, substitutes $b_i$ for the provisional value t, and substitutes i for the variable j. The processing then moves to step S711. In step S711, the internal representation generating unit 103 substitutes i−1 for the loop variable i. Next, in step S712, the internal representation generating unit 103 determines whether the loop variable i is equal to or higher than 0 or not. If so, the processing returns to step S703. If not, the processing moves to step S713. In step S713 the internal representation generating unit 103 determines whether the variable j is equal to or higher than 0 to check whether any provisional value t has not been output. If so, the processing moves to step S714. If not, the processing ends. In step S714, the internal representation generating unit 103 outputs the provisional value t as a value of m substitutes "count+1"

for the variable "count", and outputs 0 as a value of the remaining digits $m_{j-i}, m_{j-2}, \ldots, m_0$. Then, the processing ends.

Figure 8:
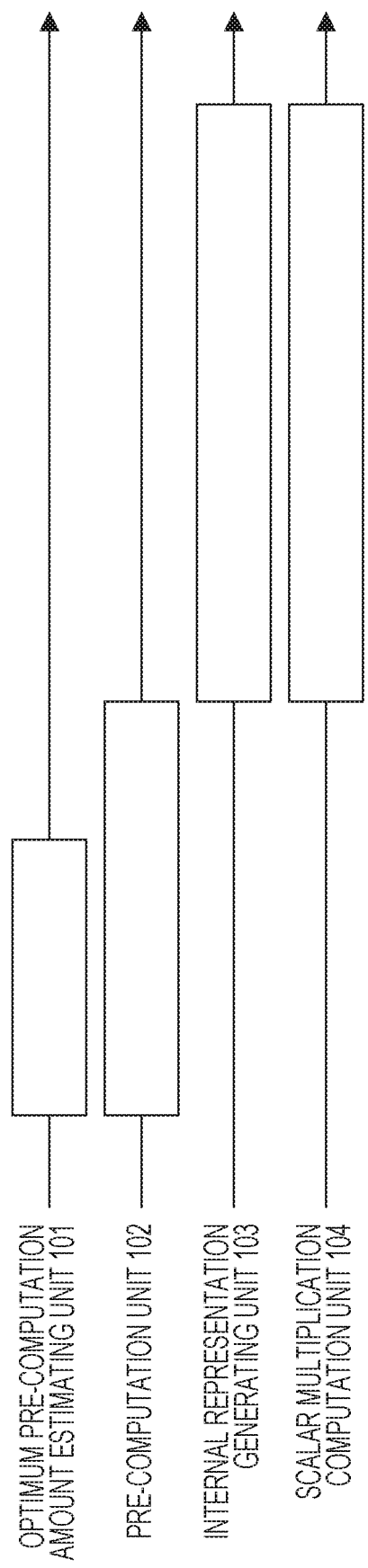
FIG. 8 illustrates clock times when the components illustrated in FIG. 1 operate.

FIG. 8 illustrates clock times when the optimum pre-computation amount estimating unit 101, the pre-computation unit 102, the internal representation generating unit 103, and the scalar multiplication computation unit 104 illustrated in FIG. 1 operate. First of all, the optimum pre-computation amount estimating unit 101 and the pre-computation unit 102 operate simultaneously and perform respective processes in parallel. The optimum pre-computation amount estimating unit 101 decides an optimum pre-computation amount r. When the pre-computation unit 102 completes the pre-computation up to the optimum pre-computation amount r, the internal representation generating unit 103 and the scalar multiplication computation unit 104 start operating simultaneously and perform respective processes in parallel. Because both of the MOF generation algorithm and the scalar multiplication algorithm process sequentially from the most significant bit (from left to right), the internal representation generating unit 103 and the scalar multiplication computation unit 104 perform their processes in synchronization. The internal representation generating unit 103 generates a MOF representation m sequentially from the most significant bit, and the scalar multiplication computation unit 104 processes sequentially from the most significant bit.

The optimum pre-computation amount estimating unit 101 estimates a computation cost of kP for various pre-computation amounts assumed in a case where a MOF representation is generated with the various pre-computation amounts to obtain an optimum pre-computation amount r producing a minimum computation cost of kP. More specifically, the optimum pre-computation amount estimating unit 101 regards the sum of the number of non-zero digits and the number of pre-computation amounts in a case where the scalar value k is represented by a MOF representation as computation cost and obtains an optimum pre-computation amount r for minimizing the sum. The internal representation generating unit 103 generates the MOF representation m based on the optimum pre-computation amount r instead of a window width. The scalar multiplication computing apparatus performs scalar multiplication based on an optimum pre-computation amount r estimated by using the MOF representation m to obtain kP with minimum computation cost, which can result in an improved throughput.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-041451 filed Mar. 6, 2017, which is hereby incorporated by reference herein in its entirety.

What is claimed is:

1. An apparatus for computing scalar multiplication of a point on an elliptic curve by a scalar value, the apparatus comprising:
   one or more processors; and
   at least one memory coupled to the one or more processors, the at least one memory having stored thereon instructions which, when executed by the one or more processors, cause the apparatus to:
   estimate respective computation costs for a plurality of values to be pre-computed based on the scalar value;
   select one of the plurality of values to be pre-computed based on the estimated computation costs thereof;
   pre-compute the selected value based on the point on the elliptic curve;
   change an internal representation of the scalar value by based on the selected value; and
   perform the scalar multiplication of the point on the elliptic curve based on the pre-computed value and the changed internal representation.

2. The apparatus according to claim 1, wherein the respective computation costs for the plurality of values to be pre-computed are estimated based on a number of non-zero digits of the internal representation for each of the values to be pre-computed.

3. The apparatus according to claim 2, wherein the respective computation costs are estimated based on a sum of the number of non-zero digits and the number of values to be pre-computed.

4. The apparatus according to claim 3, wherein one of: the plurality of the values to be pre-computed, a number of values corresponding to a minimum sum of the number of non-zero digits, and the number of values to be pre-computed is selected.

5. The apparatus according to claim 3, wherein in the pre-computation, an addition is performed for a number of times corresponding to the selected value.

6. The apparatus according to claim 2, wherein in the scalar multiplication, a number of times executing an addition is equal to the number of non-zero digits of the internal representation.

7. The apparatus according to claim 2, wherein in the scalar multiplication, in a case where a digit of the internal representation is not zero, a value obtained by scalar multiplication of the point on the elliptic curve by a value of the digit is added.

8. The apparatus according to claim 1, wherein in the pre-computation, three or more odd multiples of the point on the elliptic curve are computed.

9. The apparatus according to claim 8, wherein in the pre-computation, a process for adding a double value of the point on the elliptic curve to an intermediate result is repeated.

10. The apparatus according to claim 1, wherein the internal representation is performed sequentially from a most significant bit.

11. The apparatus according to claim 1, wherein scalar multiplication is performed sequentially from a most significant bit.

12. The apparatus according to claim 1, wherein the generation of the internal representation and the scalar multiplication are performed in parallel.

13. The apparatus according to claim 12, wherein, after the pre-computation is completed, the generation of the internal representation and the scalar multiplication are performed in parallel.

14. The apparatus according to claim 1, wherein the estimation of the respective computation costs and the pre-computation are performed in parallel.

15. A method for computing scalar multiplication of a point on an elliptic curve by a scalar value, the method comprising:
estimating respective computation costs for a plurality of values to be pre-computed based on the scalar value;
selecting one of the plurality of values to be pre-computed based on the estimated computation costs thereof;
pre-computing the selected value based on the point on the elliptic curve;
changing an internal representation of the scalar value by based on the selected value; and
performing the scalar multiplication of the point on the elliptic curve based on the pre-computed value and the changed internal representation.

16. A non-transitory storage medium storing a program causing a computer to implement a method for computing scalar multiplication of a point on an elliptic curve by a scalar value, the method comprising:
estimating respective computation costs for a plurality of values to be pre-computed based on the scalar value;
selecting one of the plurality of values to be pre-computed based on the estimated computation costs thereof;
pre-computing the selected value based on the point on the elliptic curve;
changing an internal representation of the scalar value by based on the selected value; and
performing the scalar multiplication of the point on the elliptic curve based on the pre-computed value and the changed internal representation.

* * * * *